(12) United States Patent
Ahmed et al.

(10) Patent No.: US 11,521,380 B2
(45) Date of Patent: Dec. 6, 2022

(54) SHADOW AND CLOUD MASKING FOR REMOTE SENSING IMAGES IN AGRICULTURE APPLICATIONS USING A MULTILAYER PERCEPTRON

(71) Applicant: Farmers Edge Inc., Winnipeg (CA)

(72) Inventors: Faisal Ahmed, Calgary (CA); Jacob Walker Bengtson, Houston, TX (US); David Eric Chalmers, Magrath (CA); Changchi Xian, Calgary (CA); Fatema Tuz Zohra, Calgary (CA); Chad Richard Bryant, Calgary (CA)

( * ) Notice: Subject to any disclaimer, the term of this patent is extended or adjusted under 35 U.S.C. 154(b) by 264 days.

(21) Appl. No.: 16/780,778

(22) Filed: Feb. 3, 2020

(65) Prior Publication Data

US 2020/0250428 A1 Aug. 6, 2020

Related U.S. Application Data

(60) Provisional application No. 62/801,008, filed on Feb. 4, 2019.

(51) Int. Cl.
*G06V 20/10* (2022.01)
*G06K 9/62* (2022.01)
(Continued)

(52) U.S. Cl.
CPC .......... *G06V 20/188* (2022.01); *A01B 79/005* (2013.01); *G06K 9/6227* (2013.01);
(Continued)

(58) Field of Classification Search
CPC ...... G06V 20/188; G06V 10/56; G06V 10/30; G06V 30/248; G06V 20/194;
(Continued)

(56) References Cited

U.S. PATENT DOCUMENTS 9,230,168 B2 * 1/2016 Gueguen ............ G06K 9/6219
9,721,181 B2 * 8/2017 Guan .................. G06K 9/6267
(Continued)

OTHER PUBLICATIONS

Chova et al., IEEE, "Cloud Screening With Combined Meris and AATSR Images" (pp. 761-764) (Year: 2009).*
(Continued)

*Primary Examiner* — Manav Seth
(74) *Attorney, Agent, or Firm* — Ryan W. Dupuis; Kyle R. Satterthwaite; Ade & Company Inc.

(57) ABSTRACT

A method for shadow and cloud masking for remote sensing images of an agricultural field using multi-layer perceptrons includes electronically receiving an observed image, performing using at least one processor an image segmentation of the observed image to divide the observed image into a plurality of image segments or superpixels, extracting features for each of the image segments using the at least one processor, and determining by a cloud mask generation module executing on the at least one processor a classification for each of the image segments using the features extracted for each of the image segments, wherein the cloud mask generation module applies a classification model including an ensemble of multilayer perceptrons to generate a cloud mask for the observed image such that each pixel within the observed image has a corresponding classification.

14 Claims, 11 Drawing Sheets

(51) Int. Cl.
   *G06T 7/11* (2017.01)
   *A01B 79/00* (2006.01)
   *G06V 10/30* (2022.01)
   *G06V 10/56* (2022.01)
   *G06V 30/24* (2022.01)

(52) U.S. Cl.
   CPC ............... *G06T 7/11* (2017.01); *G06V 10/30* (2022.01); *G06V 10/56* (2022.01); *G06V 30/248* (2022.01); *G06V 20/194* (2022.01); *G06V 30/2528* (2022.01)

(58) Field of Classification Search
   CPC ..... G06V 30/2528; G06T 7/11; A01B 79/005; G06K 9/6227
   See application file for complete search history.

(56) References Cited

U.S. PATENT DOCUMENTS

| | | | | |
|---|---|---|---|---|
| 10,740,610 | B2* | 8/2020 | Rees | G06T 7/73 |
| 10,902,302 | B2* | 1/2021 | Fu | G06N 3/04 |
| 11,116,145 | B2* | 9/2021 | Nitsch | A01C 23/007 |
| 11,126,886 | B2* | 9/2021 | Guan | G06K 9/685 |
| 2006/0018524 | A1* | 1/2006 | Suzuki | G06K 9/6292 |
| | | | | 382/128 |
| 2017/0161584 | A1* | 6/2017 | Guan | G06T 7/194 |
| 2020/0250427 | A1* | 8/2020 | Mashhoori | G06K 9/628 |
| 2022/0038172 | A1* | 2/2022 | Kargieman | G06V 20/188 |

OTHER PUBLICATIONS

Kussul et al., "Parcel Based Classification for Agricultural Mapping and Monitoring Using Multi-Temporal Satellite Image Sequences" (pp. 165-168) (Year: 2015).*
Roy et al., "Ensemble of Multilayer Perceptrons for Change Detection in Remotely Sensed Images" (pp. 49-53) (Year: 2014).*
Kussul et al., "Deep Learning Classification of Land Cover and Crop Types Using Remote Sensing Data" (pp. 778-782) (Year: 2017).*
Yhann et al., "Application of Neural Networks to AVHRR Cloud Segmentation" (pp. 590-604) (Year: 1995).*
Alireza Taravat et al., "Multilayer Perceptron Neural Networks Model for Meteosat Second Generation SEVIRI Daytime Cloud Masking", Remote Sensing, 2015, 7(2), 1529-1539; Feb. 2, 2015.
International Search Report & Written Opinion, PCT/CA2020/050101, dated May 6, 2020, 9 pages.
Yang Chen et al, "Multilevel Cloud Detection for High-Resolution Remote Sensing Imagery Using Multiple Convolutional Neural Networks", ISPRS International Journal of Geo-Information, 2018, 7(5), 181; May 9, 2018, 16 pages.

* cited by examiner

Confusion matrix:

|  | Crop | Cloud | Shadow |
|---|---|---|---|
| Crop | 4.82E+08 | 1.10E+07 | 5.94E+06 |
| Cloud | 9.02E+06 | 7.41E+07 | 1.96E+06 |
| Shadow | 1.94E+06 | 2.04E+06 | 1.33E+07 |

True label / Predicted label

FIG. 9

SHADOW AND CLOUD MASKING FOR REMOTE SENSING IMAGES IN AGRICULTURE APPLICATIONS USING A MULTILAYER PERCEPTRON

RELATED APPLICATIONS

This application claims priority to U.S. Provisional Application No. 62/801,008, filed Feb. 4, 2019, entitled "SHADOW AND CLOUD MASKING FOR REMOTE SENSING IMAGES IN AGRICULTURE APPLICATIONS USING A MULTILAYER PERCEPTRON", and hereby incorporated by reference in its entirety.

TECHNICAL FIELD

This invention describes a method and system applicable to satellite imagery for agricultural applications, which utilizes a cloud and shadow detection algorithm.

BACKGROUND

Satellite images are often affected by the presence of clouds and their shadows. As clouds are opaque at the wavelength of visible light, they often hide the ground surface from Earth observation satellites. The brightening and darkening effects of clouds and shadows influence data analysis causing inaccurate atmospheric corrections and impedance of land cover classification. Their detection, identification, and removal are, therefore, first steps in processing satellite images. Clouds and cloud shadows can be screened manually but automating the masking is important where there may be thousands of images to be processed.

Related art systems for detecting clouds and shadows in satellite images focus on imagery that have numerous bands and a wealth of information with which to work. For example, some related art systems use a morphological operation to identify potential shadow regions, which are darker in the near infrared spectral range. The related art addresses how, given a cloud mask, a sweep is done through a range of cloud heights, and addresses how the places where projected shadows would fall are calculated geometrically. The area of greatest overlap between the projections and the potential shadow regions is taken as the cloud mask. The related art, however, uses a large number (e.g., 7, 8, 9, etc.) of spectral ranges (i.e., "bands") to accomplish this cloud masking task. Satellite imagery including a greater number of bands is, generally, not available at high frequency (e.g., more than once daily) and, therefore, the images may be less useful in indicating agronomy decisions. It would be useful to accomplish cloud masking using higher frequency images, which include lower numbers of bands, to better inform the grower for making agronomy decisions.

SUMMARY

Sometimes fewer satellite bands than necessary for successful operation of agricultural applications to inform the grower for agricultural field management decisions are available, and thus related art techniques are inadequate. Systems and methods are disclosed herein for cloud masking where fewer bands of information are available than required for processing by related art systems (e.g., one, two, three, four, or five). In some embodiments, the systems and methods disclosed herein apply to a satellite image including a near infrared band ("NIR") and a visible red-green-blue ("RGB") band. Utilizing a reduced number of bands enables cloud masking to be performed on satellite imagery obtained from a greater number of satellites.

In some embodiments, the systems and methods disclosed herein perform cloud masking using a limited number of bands by performing unsupervised image segmentation, extracting features for each image segment, performing cloud masking using supervised learning of ensembled cloud masking models, and evaluating cloud masking models using a confusion matrix.

According to one aspect, a method for shadow and cloud masking for remote sensing images of an agricultural field using multi-layer perceptrons is provided. The method includes electronically receiving an observed image, performing using at least one processor an image segmentation of the observed image to divide the observed image into a plurality of image segments or superpixels, extracting features for each of the image segments using the at least one processor, and determining by a cloud mask generation module executing on the at least one processor a classification for each of the image segments using the features extracted for each of the image segments, wherein the cloud mask generation module applies a classification model including an ensemble of multilayer perceptrons to generate a cloud mask for the observed image such that each pixel within the observed image has a corresponding classification. The classification may be selected from a set including a cloud classification, a shadow classification, and a field classification. The classification of each of the image segments may performed using five or fewer bands of the observed image. The bands may include a visible band (e.g. red spectral band, green spectral band, blue spectral band), a near infrared band, and a red edge band. The method may further include applying the cloud mask to the observed image. The method may further include using a resulting image to generate a yield prediction for the agricultural field or for other purposes. The method may further include using the cloud generation module executing on the one or more processors to train the classification model. The method may further include using the cloud generation module executing on the one or more processors for evaluating one or more classification models. The evaluating may be performed using a confusion matrix.

According to another aspect, a system for shadow and cloud masking for remotely sensed images of an agricultural field is provided. The system includes a computing system having at least one processor for executing a cloud mask generation module, the cloud mask generation module configured to: receive an observed image, apply a segmentation model to the observed image to divide the observed image into a plurality of superpixels (or image segments), extract features of each of the superpixels, and determine a classification for each of the superpixels using the features extracted for each of the superpixels and by applying a classification model including an ensemble of multilayer perceptrons to generate a cloud mask for the observed image such that each pixel in the observed image has a corresponding classification. The classification may be selected from a set including a cloud classification, a shadow classification, and a field classification. The classification of each of the superpixels may be performed using a limited number of color bands of the observed image such as five, four, three, two, or one (e.g. visible (RGB), near infrared, red edge, etc.). The computing system may be further configured to apply the cloud mask to the observed image and use a resulting image to generate a yield prediction for the agricultural field or for other purposes. The cloud generation module may be further configured to train the classification model and to evaluate one or more classification models.

According to another aspect, a method for shadow and cloud masking for remote sensing images of agricultural fields using multilayer perceptron may include receiving an observed image of an agricultural field from a data store, segmenting the observed image of the agricultural field into superpixels, determining a feature set of the observed image using the superpixels, determining a classification for each superpixel, inputting the superpixels into a multilayer perceptron to train a model, and evaluating the multilayer perceptron using an evaluation function.

According to another aspect, a method for shadow and cloud masking for remote sensing images of agricultural fields using multilayer perceptron may include receiving a request to generate a cloud map, requesting an observed image, segmenting the observed image into superpixels and determining a feature set, inputting the superpixels into an ensemble, determining a classification for each superpixel, determining an aggregate classification for each superpixel, and applying a classification mask to image to obtain required information.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 9 illustrates a confusion matrix for a cloud masking task, according to one example embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the disclosed principles. It is noted that wherever practicable, similar or like reference numbers may be used in the figures and may indicate similar or like functionality. The figures depict embodiments of the disclosed system (or method) for purposes of illustration only.

System Environment

Figure 1:
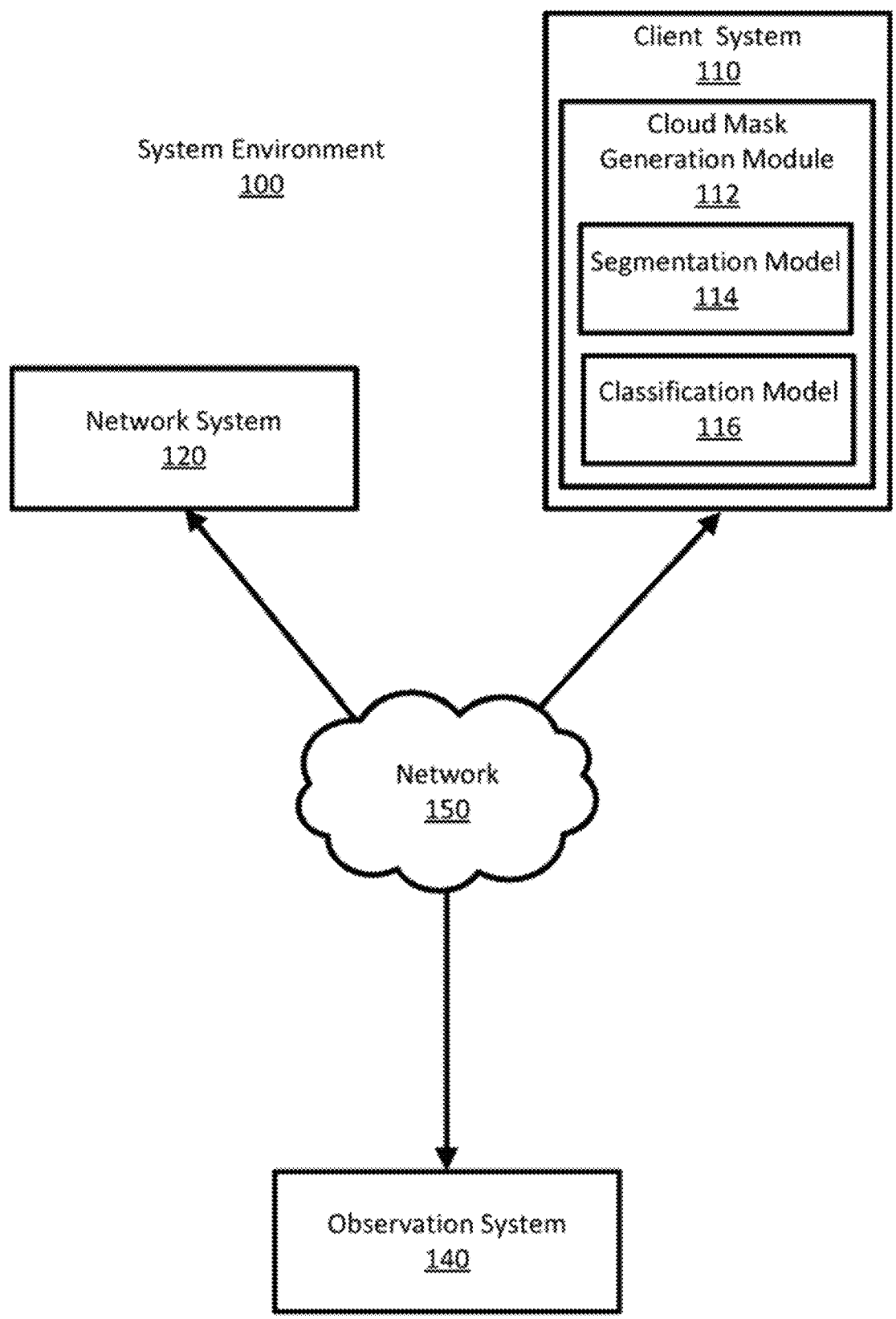
FIG. 1 illustrates a system environment for generating a cloud map for an agricultural field, according to one example embodiment.

FIG. 1 illustrates a system environment for generating a cloud map for an agricultural field. Within the system environment 100, a client system 110 includes a cloud mask generation ("CMG") module 112 that generates a cloud map. A cloud map is an image of an agricultural field in which a classification for each pixel in the image has been determined by the CMG module 112. The classifications may be, for example, "cloud," "shadow," or "field." In other examples, a cloud map is some other data structure or visualization indicating classified clouds, shadows, and fields in an observed image.

The CMG module 112 employs a classification model 116 to generate a cloud map from an observed image of an agricultural field. The client system 110 may request observed images via the network 150 and the network system 120 may provide the observed images in response. The network 150 is typically a cell tower but can be a mesh network or power line. The network system 120 is typically the Internet but can be any network(s) including but not limited to a LAN, a MAN, a WAN, a mobile wired or wireless network, a private network, a virtual private network, or a combination thereof. A network system 120 accesses observed images from an observation system 140 via a network 150.

In various embodiments, the system environment 100 may include additional or fewer systems. Further, the capabilities attributed to one system within the environment may be distributed to one or more other systems within the system environment 100. For example, the CMG module 112 may be executed on the network system 120 rather than the client device 110.

The CMG module 112 accepts an observed image from the network system 120 and outputs a cloud map to a user of the client system 110. The CMG module 112 may also accept an observed image from the observation system 140. Imagery data may consist of an image or photograph taken from a remote sensing platform (airplane, satellite, or drone). Imagery is a raster data set; each raster being comprised of pixels. Each pixel has a specific pixel value (or values) that represents ground characteristics. The observed images include a few pixels. Each pixel includes information in several data channels (e.g., 3, 4, 5), each channel associated with a particular spectral band ("band information"). The CMG module 112 uses the band information to generate the cloud map.

Figure 2A:
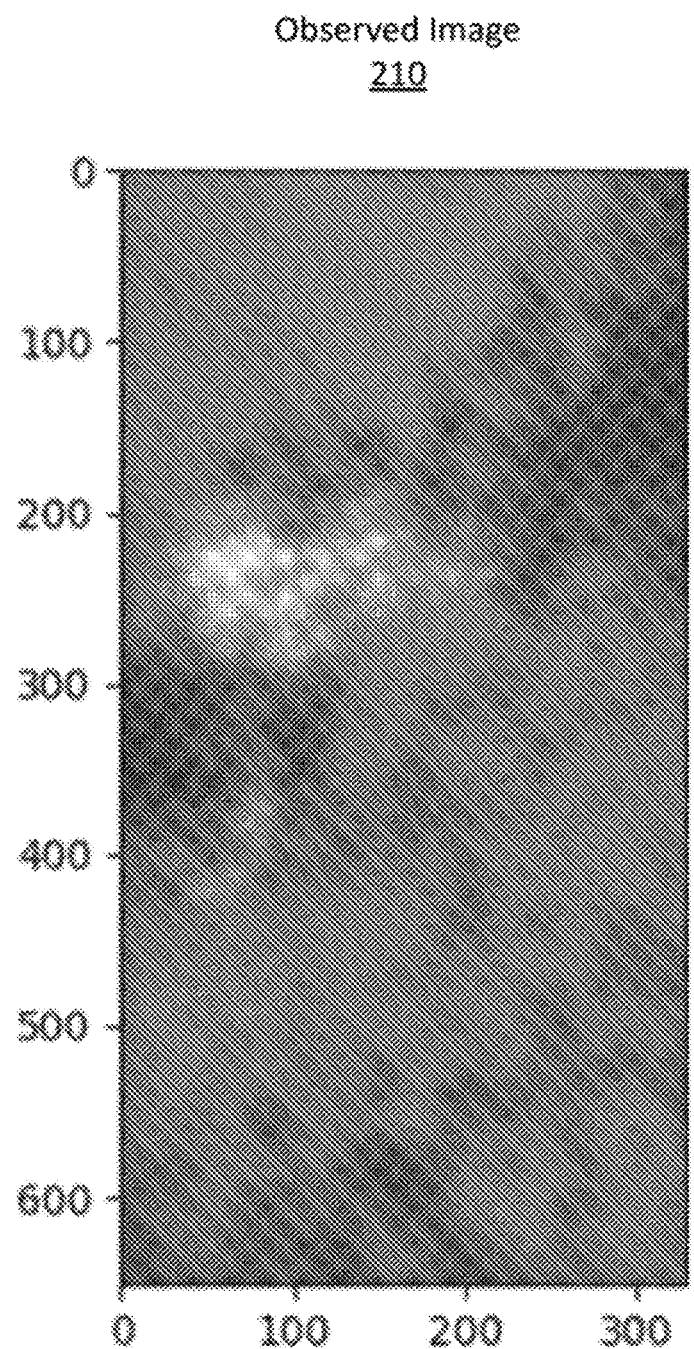
FIG. 2A illustrates an observed image, according to one example embodiment.

In one example, an observed image is an image taken of an agricultural field from a satellite or a satellite network. Space-based satellites use Global Positioning System (GPS) data, which may consist of coordinates and time signals to help track assets or entities. FIG. 2A illustrates an example of an observed image, according to one example embodiment. In the illustrated example, the observed image 210 is an RGB satellite image of an agricultural field. More particularly, in this example, the observed image is a GeoTIFF image including geo-information associated with the image. The band information of the observed image 210 includes three data channels including a red spectral band, a green spectral band, and a blue spectral band.

In various embodiments, observed images may have different band information. For example, an observed image may be an image having multi-spectral bands (e.g., six or more bands) obtained by a satellite. Some examples of satellite images having multi-spectral bands include images from LANDSAT™ and SENTINEL™ satellites. In other examples, a satellite image may only have four or five bands. Some examples of satellite images having five bands are images from PLANETSCOPE™ and RAPIDEYE™ satellites. In these examples, the five bands include R, G, B, RED EDGE, and NIR bands. Some examples of satellite images having four bands include DOVE™ imaging from PLANETSCOPE™. In these examples, the four bands include R, G, B, and NIR.

Figure 2B:
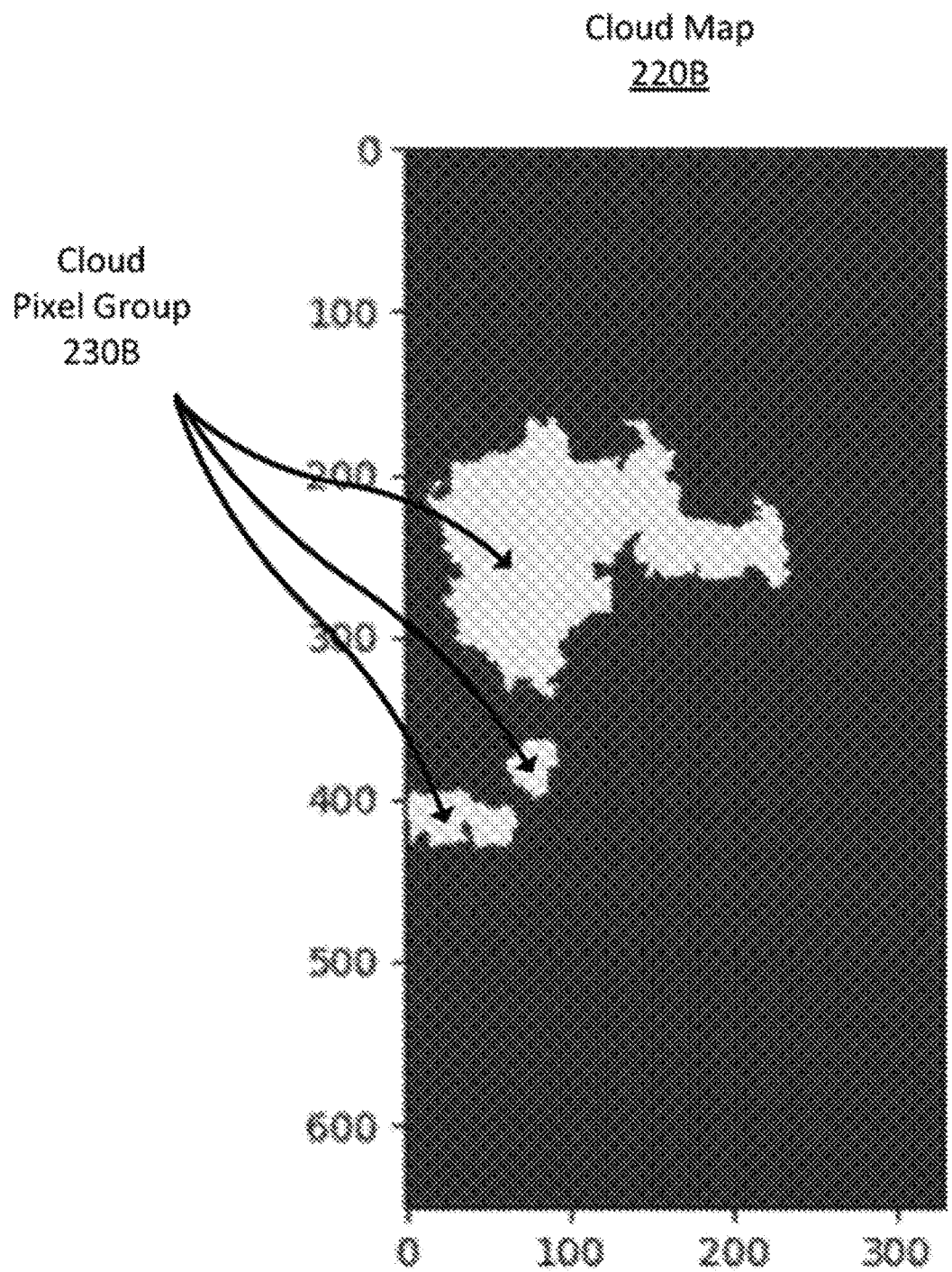
FIG. 2B illustrates a first layer of a cloud map, according to one example embodiment.
Figure 2C:
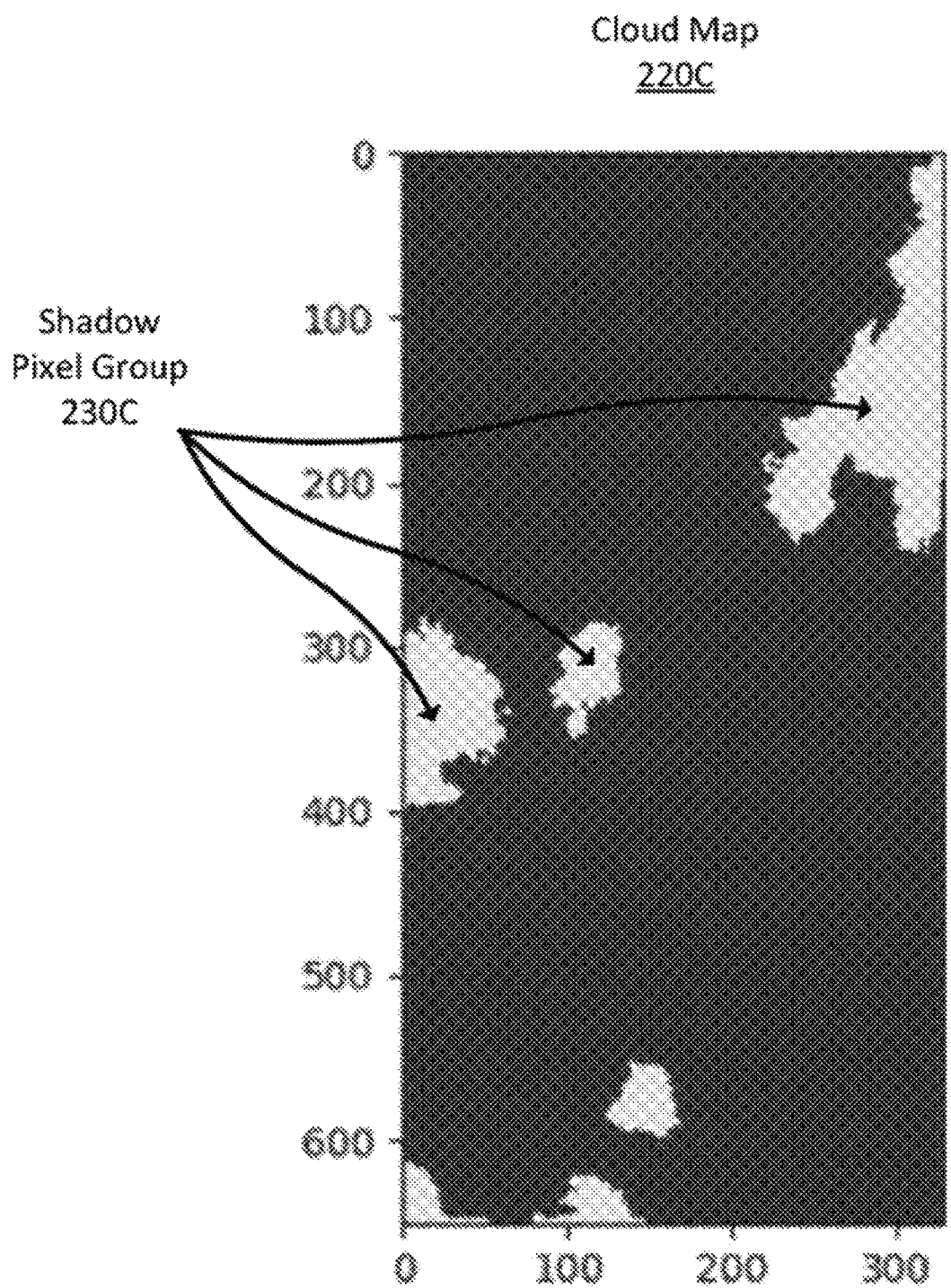
FIG. 2C illustrates a second layer of a cloud map, according to one example embodiment.

The CMG module 112 generates a cloud map. FIG. 2B and FIG. 2C illustrate two layers of a cloud map, according to one example embodiment. To generate the cloud map 220, the CMG module 112 determines a classification for each pixel in the observed image 210. FIG. 2B illustrates a first layer of the cloud map (e.g., cloud map 220B) showing groups of pixels 230B classified as clouds, and FIG. 2C illustrates a second layer of the cloud map (e.g., cloud map 220C) illustrating groups of pixels 230C classified as shadows. Notably, the cloud map is an image of the same type as the input, such as a GeoTIFF image, having the same size and shape as the observed image 210, such that the classified pixels of the cloud map 210 correspond to similarly positioned pixels in the observed image 210.

There are several benefits of this system to growers and agronomists. For example, a cloud map can be applied to various downstream projects. Examples include yield forecasting, crop type classification, and crop health. In these applications, the goal is to eliminate non-informative pixels that are related to cloud and shadow, thus focusing on information from the field.

To illustrate, for example, a field manager may wish to predict a yield for their agricultural field using an observed image. If the observed image includes pixels representing clouds and shadows, the model predicting the yield of the agricultural field may generate erroneous results. This may be caused by the clouds and shadows adversely affecting detection of healthy and unhealthy areas of plant matter in the field. As such, the cloud map may be used as a mask for the observed image. In other words, pixels that are identified as clouds or shadows may be removed from an observed image before using the observed image to generate a yield prediction for the agricultural field. Masking the cloud and shadow pixels from the observed image increases the robustness of the yield prediction model.

Cloud Masking Model

In general, data collected are processed to derive values that can drive functions such as visualization, reports, decision making, and other analytics. Functions created may be shared and/or distributed to authorized users and subscribers. Data modelling and analytics may include one or more application programs configured to extract raw data that is stored in the data repository and process this data to achieve the desired function. It will be understood by those skilled in the art that the functions of the application programs, as described herein, may be implemented via a plurality of separate programs or program modules configured to communicate and cooperate with one another to achieve the desired functional results.

In an embodiment, data modelling and analytics may be configured or programmed to preprocess data that is received by the data repository from multiple data sources. The data received may be preprocessed with techniques for removing noise and distorting effects, removing unnecessary data that skew over data, filtering, data smoothing data selection, data calibration, and accounting for errors. All these techniques should be applied to improve the overall data set.

In an embodiment, the data modelling and analytics generates one or more preconfigured agronomic models using data provided by one or more of the data sources and that are ingested and stored in the data repository. The data modelling and analytics may comprise an algorithm or a set of instructions for programming different elements of a precision agriculture system. Agronomic models may comprise calculated agronomic factors derived from the data sources that can be used to estimate specific agricultural parameters. Furthermore, the agronomic models may comprise recommendations based on these agricultural parameters. Additionally, data modelling and analytics may comprise agronomic models specifically created for external data sharing that are of interest to third parties.

In an embodiment, the data modelling and analytics may generate prediction models. The prediction models may comprise one or more mathematical functions and a set of learned weights, coefficients, critical values, or any other similar numerical or categorical parameters that together convert the data into an estimate. These may also be referred to as "calibration equations" for convenience. Depending on the embodiment, each such calibrations equation may refer to the equation for determining the contribution of one type of data or some other arrangement of equations may be used.

The CMG module 112 generates a cloud map in two stages: (i) unsupervised image segmentation of an observed image, and (ii) supervised classification on segments determined from the observed image. In one example, the CMG module 112 uses an ensemble of multilayer perceptions to classify segments as "cloud," "shadow," or "field."

The CMG module 112 performs unsupervised image segmentation on an observed image. Segmenting the observed image results in an array of superpixels representing the observed image ("segmented image"). The CMG module 112 may employ a segmentation model 114 to perform segmentation on the observed image. In one example, the segmentation model 114 is a simple linear iterative clustering (SLIC) algorithm but could be other models. Image segmentation clusters pixels in an image with homogeneous properties (e.g., color) to form a superpixel. In this process, the CMG module 112 generates superpixels by clustering pixels in an observed image into "n" number of homogeneous regions ("clusters").

When generating clusters, the CMG module 112 utilizes a distance metric to determine the similarity between two pixels on a multi-dimensional plane. The similarity is based on the values of the RGB, REDEDGE (if available), NIR band values, and their respective spatial coordinate locations. In an example, the distance metric is the Euclidean distance, but could be other distance metrics. To illustrate, CMG module 112 determines a pixel a is homogeneous to pixel b if, and only if, the distance metric (e.g., Euclidean distance) computed between a and b is the smallest among the distance metrics computed between a and all other pixels b. The CMG module determines that homogenous pixels are clusters using iterative K-means clustering. The CMG generates "n" clusters, where "n" is determined based on the row length and column length of the observed image. For example, the value of "n" has a positive correlation with a size of the observed image and, in some embodiments, is determined by the total number of pixels.

Figure 3:
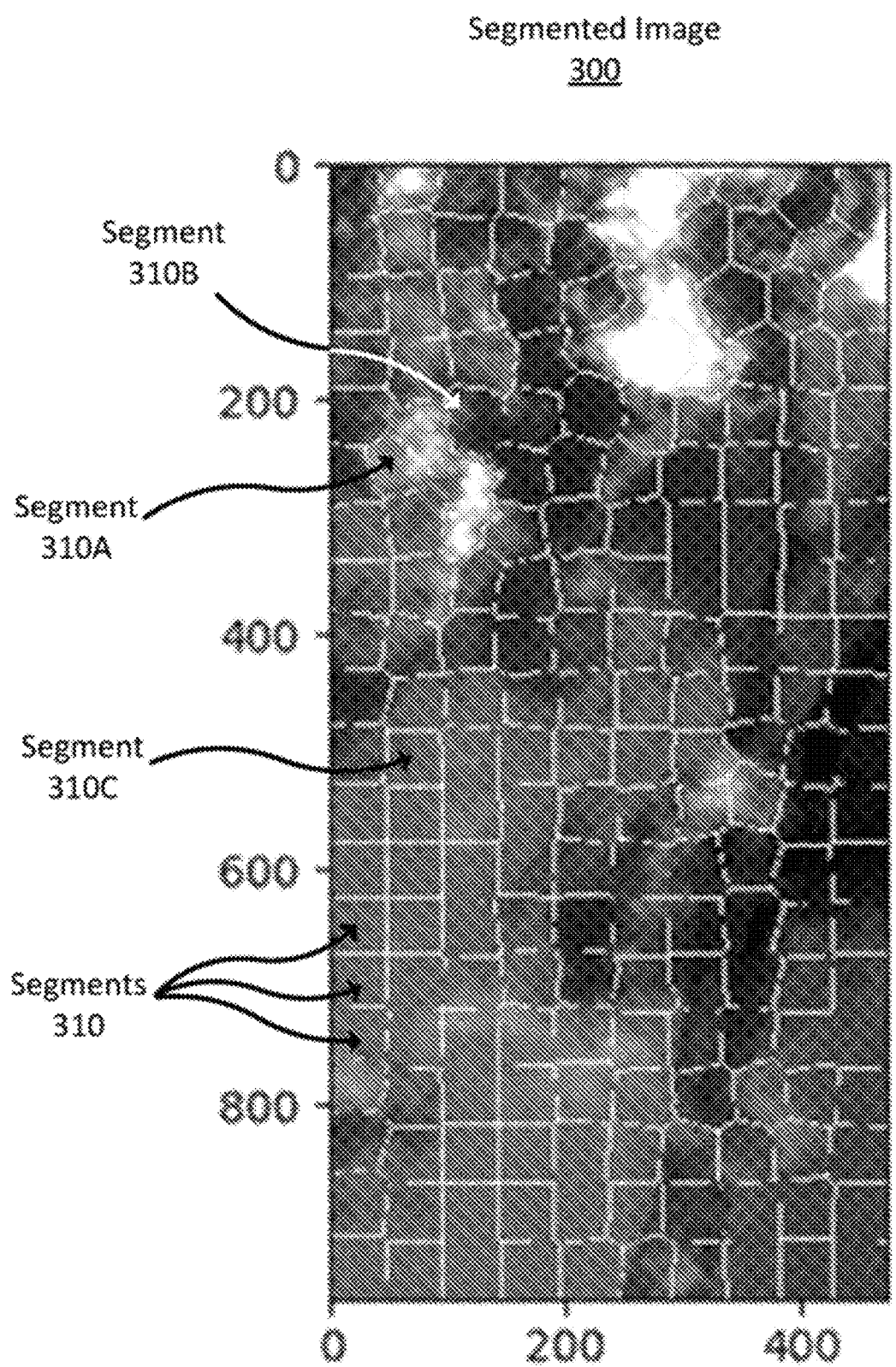
FIG. 3 illustrates a segmented image, according to one example embodiment.

To illustrate, FIG. 3 is an example of a segmented image. The segmented image 300 is an observed image processed into segments by the CMG module 112. The segmented image includes several segments 310, with each segment illustrated as a small geometric shape. Each segment in the segmented image is a superpixel whose pixels have similar characteristics (e.g., color, hue, etc.). Similar characteristics between pixels in a superpixel may indicate that the pixels represent a cloud, shadow, and/or field.

The CMG module 112 generates a classification for each segment in the segmented image 300. A classification is an identified type for a segment. For example, some classifications for segments in the observed image may include "cloud" (e.g., segment 310A), "shadow" (e.g., segment 310B) and/or "field" (e.g., segment 310C). In other words, the CMG module 112 identifies groups of pixels in an observed image representing a cloud, a shadow, and/or a field.

The CMG module 112 determines, or extracts, a feature set for each identified superpixel. A feature set includes any information that can be determined and/or derived from the RGB and/or NIR information included in the pixels of a superpixel. A feature set may include, but is not limited to, hue, saturation, and intensity (HSV) color space, along with XYZ, and CaClCb color space. A feature set may also include vegetation indices such as Normalized Difference Vegetation Index (NDVI), Simple Ratio (SR), Green Chlorophyll Index (CL green), and Meris Terrestrial Chlorophyll Index (MTCI), or any other meaningful linear or nonlinear transformation of the raw pixel value. Some embodiments of the segmentation step would use derived features as well. In some cases, additional bands may be used to determine a feature set. For example, a RED EDGE band may be used if the observed image is a RAPIDEYE™ image. Additionally, a feature set may include soil and regional information as well as weather information such as daily average cloud coverage, daily average precipitation, daily average normal irradiance, daily average relative humidity and daily average solar radiation.

The CMG module 112 determines, or extracts, a feature set using a variety of techniques. For example, the CMG module 112 performs color space conversion/computation to determine features for a feature set using the RGB and NIR data in observed images. To illustrate, the CMG module 112 converts the RGB information of a superpixel to CaClCb information for the same superpixel. In another example, the CMG module 112 performs statistical analysis to determine superpixel-specific features for a feature set. To illustrate, the CMG module 112 calculates a particular statistical property for an entire image and compares it to the particular property for an individual superpixel. The CMG module 112 uses the difference in the particular property of the superpixel and the particular property for an image to determine a feature (e.g., contrast).

The CMG module 112 determines a classification for each superpixel using the RGB, NIR, and/or feature set for each superpixel. The CMG module 112 employs a classification model 116 to determine a classification for each superpixel. In one example, the classification model 116 is a supervised classification model. Some examples of supervised classification models may include, but are not limited to, multilayer perceptron, deep neural networks, or ensemble methods. Given any of these models, the CMG module 112 learns, without being explicitly programmed to do so, how to determine a classification for a superpixel using the feature set for that superpixel. In various embodiments, the CMG model 112 may determine a classification using bands (e.g., RGB, NIR, RED EDGE) for the superpixel. Additionally, the CMG module 112 may determine a classification using summations of and ratios between bands.

One factor that makes the disclosed system unique is a specific architecture for determining a classification for each superpixel. In an example embodiment, the CMG module 112 employs a classification model 116 with an architecture, which may include ensembling of multilayer perceptrons or other model types such as gradient boosted trees, designed to need minimal preprocessing of input observed images. As an example, a CMG module employing an ensemble of multilayer perceptrons has the lowest misclassification rate among cloud masking models (e.g., 3.93%), whereas a traditional algorithm such as XGBoost has an error rate of 8.45% and a convolutional neural network has an error rate of 10.09%. In another example embodiment, the CMG module 112 employs a classification model 116 with an architecture including an ensemble of multilayer perceptrons and XGBoost. In this case, crop pixels misclassified as cloud or shadow is 3.39%.

Figure 4:
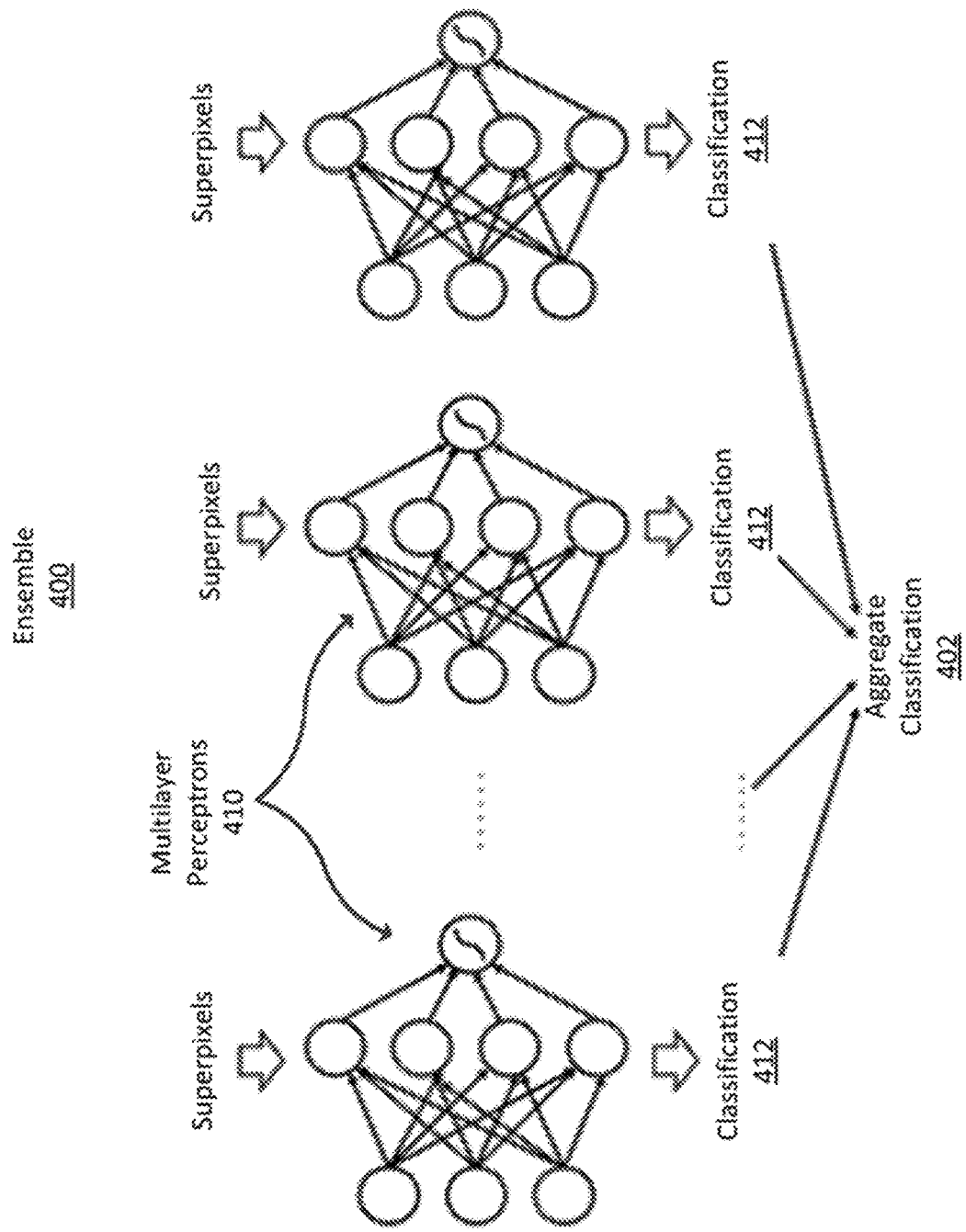
FIG. 4 illustrates an ensemble of multilayer perceptrons configured to determine a classification for each superpixel in an observed image, according to one example embodiment.

FIG. 4 is an illustration of an ensemble of multilayer perceptrons ("ensemble") configured to determine a classification for each superpixel in an observed image. In another embodiment, an ensemble of multilayer perceptrons and XGBoost can be configured to determine a classification for each superpixel in an observed image. This combination provides a good overview of shadows. In yet another embodiment, any standard methodology for supervised learning techniques can be used, such as gradient-boosted tree-based methods, Random Forest Classifiers, Support Vector Machines, KNN, neural net, and so on. The ensemble 400 determines an aggregate classification 402 (e.g., "cloud") of a superpixel based on the band information and feature set for that superpixel. The band information and feature set are inputs into the ensemble as an input vector. In an example, feature selection is used to select top features including values used to describe features herein. Some of the values include the following: segment_R_mean, image_R_mean, segment_NDVI_mean, image_NDVI_mean, etc. Here, "segment_" features provide colors/vegetation indices information within the segments, and the "image_" features provide information with the entire range of the image.

The ensemble 400 includes a number (e.g., 10, 20, 30, etc.) of multilayer perceptrons 410 with each multilayer perceptron trained to individually determine a classification 412 of the superpixel. Each multilayer perceptron 410 may be individually trained to determine a classification 412 for a superpixel rather than each multilayer perceptron being clones of a single multilayer perceptron trained to determine a classification for the superpixel. In some examples, the number of multilayer perceptrons 410 in the ensemble 400 may be based on the type of observed image input into the cloud masking model. For example, the ensemble may include ten multilayer perceptrons for RAPIDEYE™ observed images and twenty multi-layer perceptrons for PLANETSCOPE™ observed images.

To determine a classification for a superpixel, the CMG module 112 inputs the band information and feature set for the superpixel into each multilayer perceptron 410 of the ensemble 400. Each multilayer perceptron 410 determines a classification 412 of the superpixel. The CMG module 112 determines that an aggregate classification 402 for the superpixel is the classification determined by the plurality of multilayer perceptrons. Other methods of determining an aggregate classification 402 for a superpixel based on individual classifications 412 for that superpixel determined by multilayer perceptrons in an ensemble are also possible.

Another factor which makes this method unique is that the CMG module 112 determines a classification for superpixels using information from RGB and NIR (and RED EDGE) bands only. Existing cloud masking methods for agricultural applications use many multi-spectral bands and NIR, which are useful for detecting features of clouds. Satellites used for agricultural purposes may have only four or five bands. The algorithm in these methods work with this limited number of bands.

Training the Cloud Masking Model

In order to train the model and determine the values for the model parameters (i.e., for the calibration equations), certain data may be collected as inputs for training the model. The type of modelling function may vary by implementation. In one embodiment, regression techniques such as ElasticNet, linear, logistic, or otherwise may be used. Other techniques may also be used, examples of which include Random Forest Classifiers, Neural Nets, Support Vector Machines, and so on. Once trained, the resulting prediction model can then be used to predict a specific type of data. The predictions versus the benchmark datasets are validated by taking the test cases and relating them back to the true values of a traditional model in effort to validate that the model is working. Validation involves relating the predictions of the model to the true values that were collected.

Figure 8:
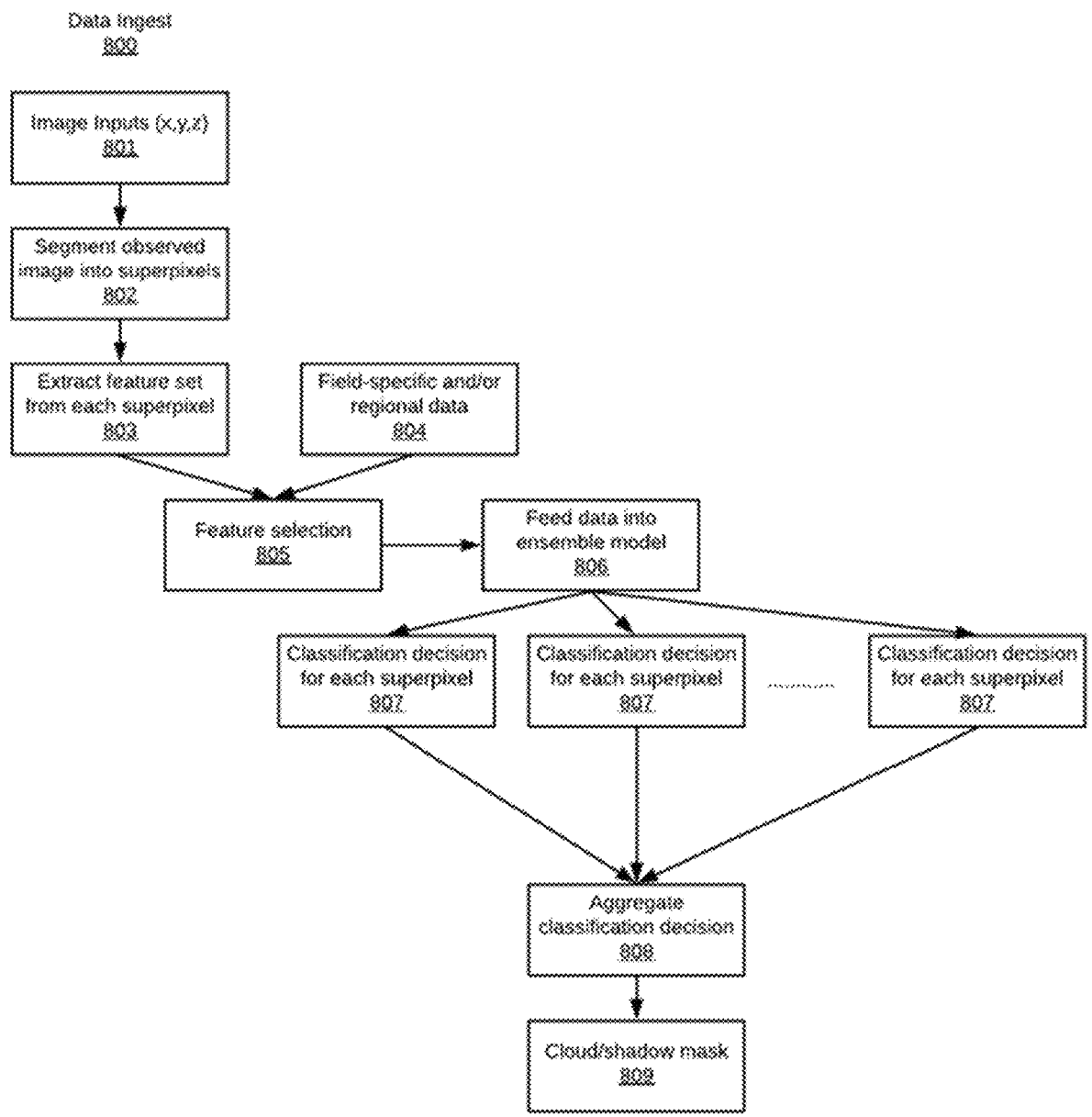
FIG. 8 illustrates an overview of data ingest in the MLP cloud masking model, according to one example embodiment.

FIG. 8 is an example overview of data ingest for an MLP and XGBoost-based ensemble cloud masking model. Image inputs (x,y,4) 801 are ingested into the model. In these examples, the four bands include R. G, B, and NIR bands. An unsupervised image segmentation approach (e.g., simple linear iterative clustering (SLIC) algorithm) is used to segment a given image into superpixels. Cloud/shadow/field pixels are usually well divided into different segmentations due to their different appearance, but not consistently. Only pure cloud/shadow/field segments are chosen to train the model.

Feature sets are extracted from each segment or superpixel 803. Imagery features are computed which are useful in differentiating cloud/shadow/field. Local band features within each segment (e.g., mean of R/G/B, ratios amongst R/G/B and various vegetation indices, such as NDVI, EVI, etc.) are extracted from the different color bands and transformed color spaces (e.g., HSV color, ClCaCb color, etc.). Global color features within the full image e.g., mean of full image R/G/B, etc.) are also included as features. Some field specific weather data includes average cloud coverage, average normal irradiance, etc.) to include them as features for the classification task.

Features of each segment then become one row of the training data. A feature selection approach 805 is used to select the top features of the MLP model as well as for the XGBoost model. Other feature selection techniques can also be used such as, but not limited to, recursive feature elimination, threshold elimination, or simple Pearson correlation.

For the supervised learning step, data is fed into the ensemble model 806 of multiple MLP and XGBoost models. Multiple MLP and XGBoost models are trained by a sub-sampled data set with relatively balanced data distribution, so that each model has seen sufficient data in each class. Each model is trained using the important features selected using the feature selection approach. When making predictions, prediction probabilities for each model are secured. The average of the two probabilities from the MLP and gradient boosted tree model are taken and then the appropriate class 807 for each segment is selected. Finally, the most voted class is returned as the final prediction for that segment 808. A cloud/shadow mask 809 is then created.

The CMG module 112 trains a classification model 116 (e.g., a multilayer perceptron) using a number of superpixels having a previously determined classification ("indicator"). In one example, an indicator is a superpixel having a classification determined by a human. To illustrate, the pixels of a superpixel are shown to a human and the human identifies the pixels of the superpixel as cloud, shadow, or field. The band information and feature set for the superpixel are associated with the classification and can be used to train a classification model. In another example, an indicator is a superpixel having a classification determined by a previously trained model ("previous model"). To illustrate, the band information and feature set for a superpixel are input into a model trained to determine a classification for the superpixel. In this example, the previous model outputs a classification and the band information and feature set for the superpixel are associated with the classification. The band information and feature set for the superpixel are associated with the classification and can be used to train another classification model.

CMG module 112 trains the classification model 116 using indicators (e.g., previously labelled observed images). Each indicator has a single classification and is associated with the band information and feature set for that indicator. The classification model 116 inputs a number of indicators (e.g., 400,000) and determines that latent information included in the band information and feature set for the indicators are associated with specific classifications.

The CMG module 112 may evaluate the precision and/or accuracy of a trained classification model 116 using an evaluation function. For example, the evaluation function may determine an accuracy and precision for the trained classification model 116. Accuracy is a measure of the true positives relative to all data points and precision is a measure of true positives relative to the combination of true positives and false positives. In an example, the evaluation function determines that the precision for a trained classification model is 99.5% when using a set of input observed images (e.g., PlanetScope imagery data).

Some other examples of an evaluation function are a confusion matrix or an error matrix. The output of the evaluation function may allow visualization of the performance of a machine learning algorithm. In one example, the confusion matrices and evaluation scores used for evaluating models are based on Leave-One-Farm-Out cross validation and are on the pixel level, although other grouping mechanisms for example k-folds, can be used. In Leave-One-Farm-Out cross validation, the observed images are split into a training set and a test set. The classification model is trained on the training set and tested on the test set. In this example, observed images of the same agricultural farm will end up within either the training set or the test set. Thus, in training, the classification model will never see an observed image from the test set preventing information leakage and inaccurate training. FIG. 9 illustrates a confusion matrix for our cloud masking task. The rows of the confusion matrix represent the instances of the actual classes and the columns represent the instances of the predicted classes. The correctly identified classes are in the diagonal of the table. For example, in FIG. 9 the number of correctly identified crop, cloud and shadow pixels are 4.82E+08, 7.41E+07, and 1.33E+07 respectively. From each row we can also calculate the percentage of pixels that are incorrectly classified as other classes. For example, the percentage of crop pixels being detected as cloud or shadow is 3.4%, the percentage of cloud pixels being detected as crop is 10.6%, and the percentage of shadow pixels being detected as crop is 11.2%. We can also derive the precision for each class from the confusion matrix. In multiclass classification, precision is the fraction of correctly predicted class out of all instances where the algorithm predicted that class (correctly and incorrectly). In this case, the precision for crop, cloud, and shadow are 0.98, 0.85, and 0.63.

Figure 5:
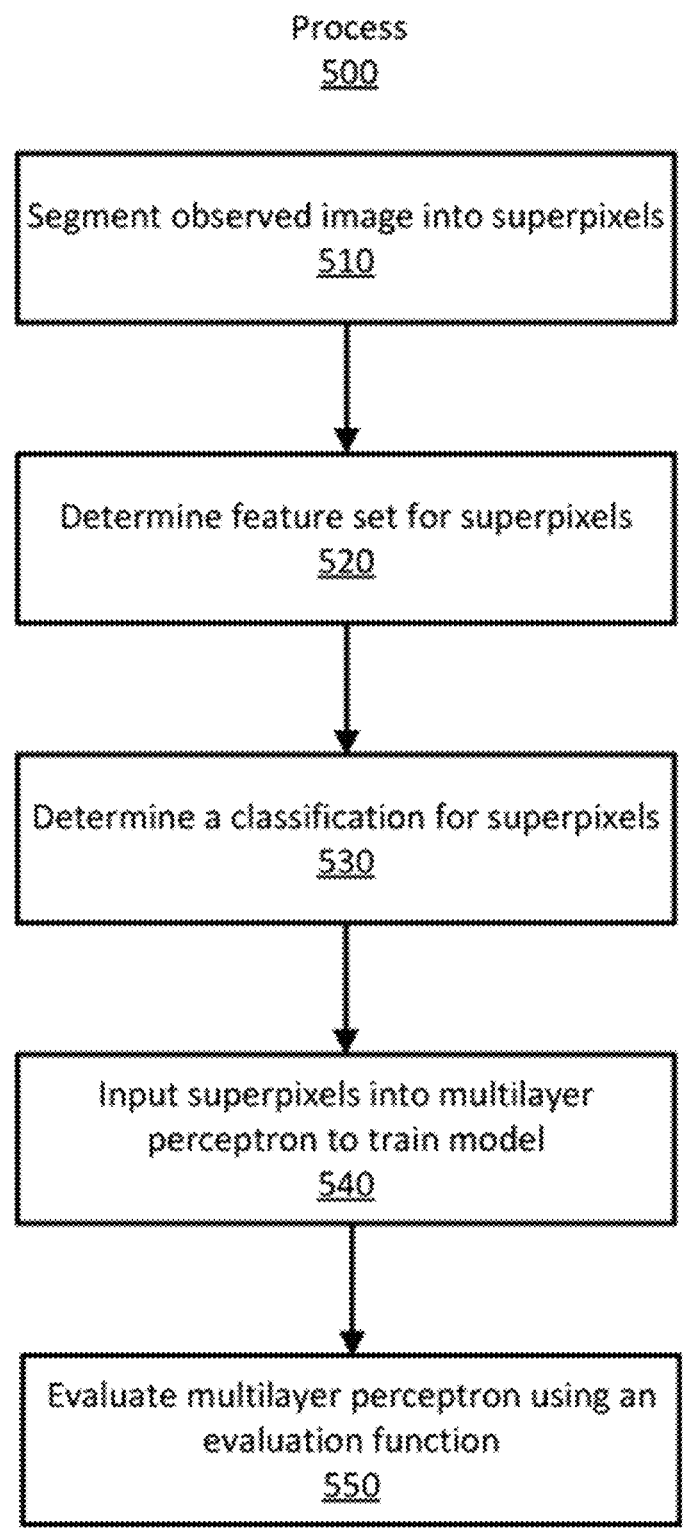
FIG. 5 illustrates a method for training a classification model, according to one example embodiment.

FIG. 5 illustrates a process for training a classification model, according to one example embodiment. In an example embodiment, the client system 110 executes the process 500. In an example embodiment, the CMG module 112 employs the classification model (e.g., classification model 116) to determine a classification for superpixels of an observed image as "cloud," "shadow," or "field."

A CMG module 112 of the client system 110 segments, at step 510, an observed image (e.g., observed image 210) into a segmented image (e.g., segmented image 300) including a number of segments (e.g., segments 310). In an example, the CMG module 112 segments the observed image 210 based on RGB color similarity and pixel distance in the observed image 210. Segmentation results in pixels representing clouds, shadows, and fields being grouped into superpixels. Generally, only superpixels including solely cloud, shadow, or field pixels are selected to train the model.

The CMG module 112 determines, at step 520, a feature set for each superpixel. The CMG module 112 computes various features that may differentiate between pixels representing clouds, shadows, and fields. These features may include local color features within each superpixel (e.g., mean of R/G/B and ratios amongst R/G/B), global color features within the full image to provide information on the contrast between segments and their source image (e.g., mean of full image R/G/B, etc.), transformed color spaces and vegetation indices, HSV color, LAB color, NDVI, Enhanced Vegetation Index (EVI), etc.; and day of the year the image is observed.

An actor determines, at step 530, a classification for each superpixel. The actor may be a human or a previously trained classification model.

The CMG module 112 inputs, at step 540, the classified superpixels into a multilayer perceptron (e.g., multilayer perceptron 410) to train the multilayer perceptron to identify clouds, shadows, and fields based on the band information and feature set for the superpixel. The CMG module 112 may guide training based on a ratio of the number of cloud, shadow, and field superpixels found in the previously classified superpixels.

The CMG module 112 evaluates, at step 550, the capabilities of the trained multilayer perceptron using an evaluation function. The evaluation function determines the accuracy and/or precision of the multilayer perceptron in correctly determining a classification for a superpixel. Based on the result of evaluation function, the multilayer perceptron may be further trained.

Generating a Cloud Map

Figure 6:
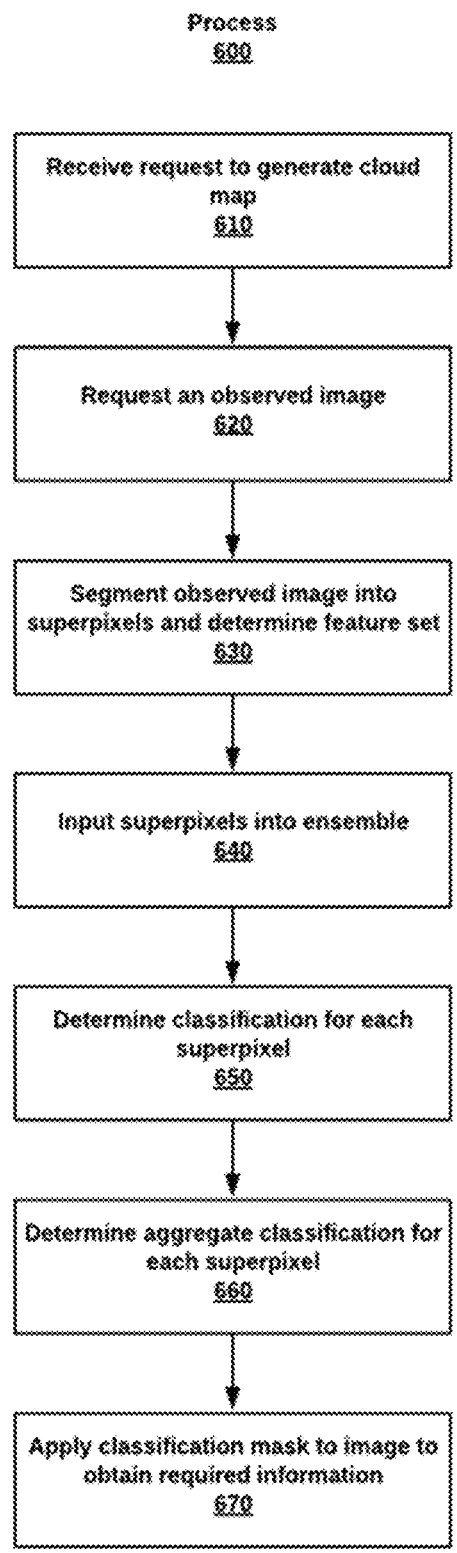
FIG. 6 illustrates a method for generating a cloud mask, according to one example embodiment.

FIG. 6 illustrates a process for generating a cloud map, according to one example embodiment. In an example embodiment, the client system 110 executes the process, at step 600, to generate a cloud map (e.g. cloud map 220).

The client system 110 receives, at step 610, a request to generate the cloud map (e.g., cloud map 220). The client system 110 requests, at step 620, an observed image (e.g., observed image 210) from network system 120 via network 150. The client system 110 receives the observed image 210 from network system 120 in response. The observed image 210 is a satellite image of an agricultural field obtained by observation system 140. In some embodiments, client system 110 requests the observed image 210 from observation system 140 and receives the observed image 210 from observation system 140 in response.

A CMG module 112 of client system 110 segments, at step 630, the observed image 210 into superpixels based on the band information (e.g., RGB and NIR) for each pixel in the observed image 210. The CMG module 112 may employ a segmentation model (e.g. segmentation model 114) to segment the observed image. The CMG module 112 determines a feature set for each of the determined superpixels.

The CMG module 112 inputs, at step 640, the band information and feature set for each superpixel into a classification model (e.g., classification model 116). In an example embodiment, the classification model includes an ensemble (e.g., ensemble 300) of multilayer perceptrons (e.g., multilayer perceptrons 410).

For each multilayer perceptron, the CMG module 112 determines, at step 650, a classification for each superpixel (e.g., classification 412) based on the band information and feature set for each superpixel. The classification may be "cloud," "shadow," or "field."

The CMG module 112 determines, at step 660, an aggregate classification (e.g., aggregate classification 402) for each superpixel based on the classifications determined by each of the multilayer perceptrons. In an example, the CMG module 112 determines the aggregate classification is the classification determined by the plurality of the multilayer perceptrons and possibly inclusion of other classification methodologies such as XGBoost, for example. The CMG module 112 generates a cloud map using the aggregate classifications. The cloud map is the observed image with each pixel classified with their aggregate classification. The CMG model 112 applies, at step 670, the classification mask to an unknown image in order to obtain the required cloud map for the observed image.

To create a cloud mask, all the pixels are set to zero in the original image. Some pixels are subsequently identified as cloud and set to one and identified shadows are set to two. A cloud mask is created and placed on top of the original image in order to extract desired information.

Cloud pixels skew results by adding in high pixel values, thus affecting imagery techniques that utilize all pixels. Shadow pixels depress the intensity and can affect how data is interpreted but they do not have the large effect that cloud pixels have on the data average.

Quantitatively, removing both cloud and shadow pixels allows applications that use imagery techniques (for example crop health, yield prediction, and harvest information) to generate more accurate results. Pixels that affect the calculations of the product are removed and, therefore, do not dramatically alter the results. Growers will acquire improved information for their applications, which aids in achieving better agronomic decisions.

Qualitatively, the cloud removal eliminates pixels with extra high values that draw attention away from regions of valuable field information. The high pixel intensities create a poor data scale, hiding important information and potentially overwhelming small details that can be missed by a grower viewing a display. Removing these high-value pixels can ultimately improve the decision-making process. If higher-quality data is fed into applications addressing crop health or pests, for example, better agronomic decisions can then be made.

Example Computer System

Figure 7:
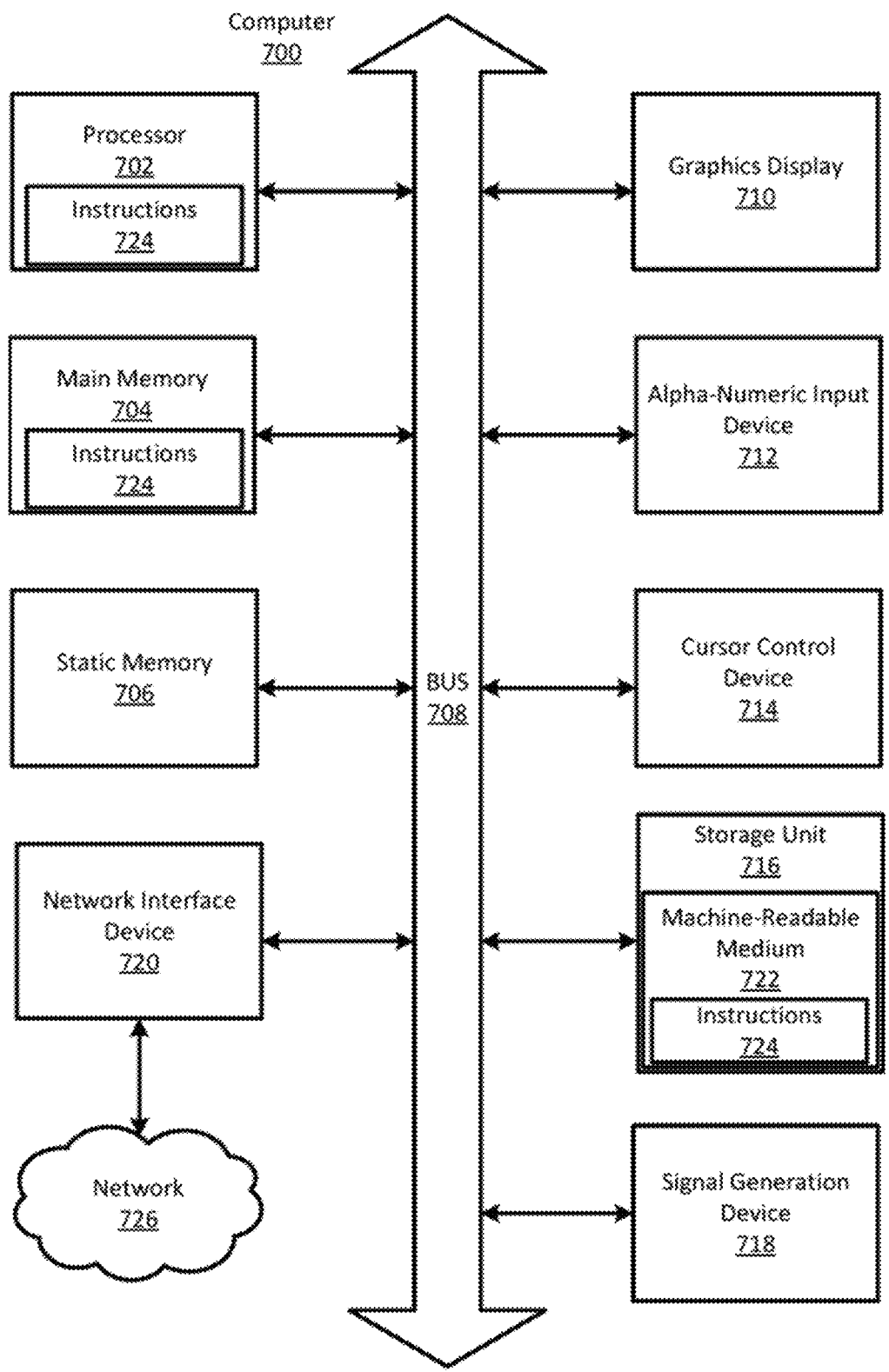
FIG. 7 illustrates an example computing system, according to one example embodiment.

FIG. 7 is a block diagram illustrating components of an example machine for reading and executing instructions from a machine-readable medium such as may be using within a computing system. Specifically, FIG. 6 shows a diagrammatic representation of network system 120 and client device 110 in the example form of a computer system 700. The computer system 700 can be used to execute instructions 724 (e.g., program code or software which may be in the form of a module) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the client device 110 or network system 120 described in FIG. 1. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 (e.g., network 120) via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but is not be limited to, data repositories in the form of solid-state memories, optical media, and magnetic media.

Although various examples and embodiments have been shown and discussed throughout, the present invention contemplates numerous variations, options, and alternatives.

What is claimed is:

1. A system for shadow and cloud masking for remotely sensed images of an agricultural field, the system comprising:
   a computing system having at least one processor for executing a cloud mask generation module, the cloud mask generation module being configured to:
   receive an observed image of the agricultural field;
   apply a segmentation model to the observed image to divide the observed image into a plurality of superpixels;
   extract features of each of the superpixels, in which the extracted features include a combination of imagery based features derived from the observed image and non-imagery based features derived from acquired geographic, physical, or meteorological data associated with the agricultural field;
   determine a classification for each of the superpixels using the features extracted for each of the superpixels and by applying a classification model including an ensemble of multilayer perceptrons to generate a cloud mask for the observed image such that each pixel in the observed image has a corresponding classification.

2. The system of claim 1 wherein the classification is selected from a set comprising a cloud classification, a shadow classification, and a field classification.

3. The system of claim 2 wherein the classification of each of the superpixels is performed using five or fewer bands of the observed image.

4. The system of claim 3 wherein the classification of each of the superpixels is performed using a visible band.

5. The system of claim 4 wherein the classification of each of the superpixels is performed using a visible band, a near infrared band, and a red edge band.

6. The system of claim 1 wherein the computing system is further configured to applying the cloud mask to the observed image.

7. The system of claim 1 wherein the computing system is further configured to apply the cloud mask to the observed image and use a resulting image to generate a yield prediction for the agricultural field.

8. The system of claim 1 wherein the cloud generation module is further configured to train the classification model.

9. The system of claim 1 wherein the cloud generation model is further configured to evaluate one or more classification models.

10. The system of claim 1 wherein the non-imagery based features include soil information, regional information, and one or more daily average meteorological values associated with the agricultural field.

11. A system for shadow and cloud masking for remotely sensed images of an agricultural field, the system comprising:
   a computing system having at least one processor for executing a cloud mask generation module, the cloud mask generation module being configured to:
   receive an observed image;
   apply a segmentation model to the observed image to divide the observed image into a plurality of superpixels;
   extract features of each of the superpixels, in which one of the features extracted for each superpixel is derived by: (i) calculating a global statistical property relating to an entirety of the observed image, (ii) calculating a local statistical property relating individually to the superpixel, and (iii) calculating said one of the features extracted using both the global statistical property and the local statistical property of the superpixel as inputs;

determine a classification for each of the superpixels using the features extracted for each of the superpixels and by applying a classification model including an ensemble of multilayer perceptrons to generate a cloud mask for the observed image such that each pixel in the observed image has a corresponding classification.

12. The system according to claim 11 wherein said one of the features extracted is calculated as a difference between the global statistical property and the local statistical property of the superpixel.

13. A system for shadow and cloud masking for remotely sensed images of an agricultural field, the system comprising:

a computing system having at least one processor for executing a cloud mask generation module, the cloud mask generation module being configured to:

receive an observed image of the agricultural field;

apply a segmentation model to the observed image to divide the observed image into a plurality of superpixels;

extract features of each of the superpixels;

determine a classification for each of the superpixels using the features extracted for each of the superpixels and by applying a classification model including an ensemble of multilayer perceptrons to generate a cloud mask for the observed image such that each pixel in the observed image has a corresponding classification;

the classification of each of the superpixels being performed using the features extracted including color space features, the color space features consisting of (i) RGB, (ii) hue, saturation and intensity, (iii) XYZ, and (iv) CaClCb.

14. A system for shadow and cloud masking for remotely sensed images of an agricultural field, the system comprising:

a computing system having at least one processor for executing a cloud mask generation module, the cloud mask generation module being configured to:

receive an observed image of the agricultural field;

apply a segmentation model to the observed image to divide the observed image into a plurality of superpixels;

extract features of each of the superpixels;

determine a classification for each of the superpixels using the features extracted for each of the superpixels and applying a classification model including an ensemble of multilayer perceptrons to generate a cloud mask for the observed image such that each pixel in the observed image has a corresponding classification;

the classification of each of the superpixels being performed using the features extracted including vegetation index based features, the vegetation index based features including (i) Normalized Difference Vegetation Indices, (ii) Simple Ratio indices, (iii) Green Chlorophyll Indices, and (iv) Meris Terrestrial Chlorophyll Indices.

* * * * *